(12) United States Patent
Umekida et al.

(10) Patent No.: US 7,857,521 B2
(45) Date of Patent: Dec. 28, 2010

(54) BEARING APPARATUS FOR A WHEEL OF VEHICLE

(75) Inventors: Mitsuru Umekida, Iwata (JP); Hiroshi Kawamura, Iwata (JP); Kazunari Yamamoto, Iwata (JP)

(73) Assignee: NTN Corporation (JP)

( * ) Notice: Subject to any disclaimer, the term of this patent is extended or adjusted under 35 U.S.C. 154(b) by 0 days.

(21) Appl. No.: 12/115,730

(22) Filed: May 6, 2008

(65) Prior Publication Data
US 2009/0046972 A1    Feb. 19, 2009

Related U.S. Application Data

(63) Continuation of application No. PCT/JP2006/322190, filed on Nov. 7, 2006.

(30) Foreign Application Priority Data

| Nov. 7, 2005 | (JP) | ............................. 2005-322323 |
| Nov. 11, 2005 | (JP) | ............................. 2005-327434 |
| Nov. 11, 2005 | (JP) | ............................. 2005-327436 |

(51) Int. Cl.
*F16C 33/48* (2006.01)
*F16C 33/56* (2006.01)
*F16C 33/34* (2006.01)

(52) U.S. Cl. ........................ 384/572; 384/576; 384/565

(58) Field of Classification Search ................ 384/565, 384/572, 576, 589
See application file for complete search history.

(56) References Cited

U.S. PATENT DOCUMENTS 5,189,791 A * 3/1993 Alling .................... 29/898.067

(Continued)

FOREIGN PATENT DOCUMENTS

JP    11-044322    2/1999

(Continued)

*Primary Examiner*—Thomas R Hannon
*Assistant Examiner*—Justin Krause
(74) *Attorney, Agent, or Firm*—Harness, Dickey & Pierce, P.L.C.

(57) ABSTRACT

A vehicle wheel bearing apparatus with a back-to-back double row tapered roller bearing has an outer member integrally with a body mounting flange and double row outer raceway surfaces tapered open respectively axially inward and outward. An inner member include a wheel hub and an inner ring or an outer joint member of a constant velocity universal joint. The wheel hub has a wheel mounting flange and one inner raceway surface arranged oppositely to one of the double row outer raceway surfaces and a cylindrical portion. The inner ring or the outer joint member of a constant velocity universal joint are press fit onto the cylindrical portion and include the other inner raceway surface arranged opposite to the other raceway surface of the double row outer raceway surfaces. Double row tapered rollers are freely rollably held between the outer and inner raceway surfaces by cages. Seals are arranged in annular openings formed by the outer and inner members. The cages are formed of synthetic resin. Posts between pockets of the cages are arranged to be positioned radially inward of the pitch circle diameter of the tapered rollers. The width of an opening radially inward of each pocket is set so that each tapered roller is held within the pocket. The contacting tapered surfaces of the posts open radially outward so that the rollers do not fall out radially inward.

6 Claims, 10 Drawing Sheets

U.S. PATENT DOCUMENTS

| | | | |
|---|---|---|---|
| 5,975,765 A * | 11/1999 | Kawamura | 384/537 |
| 6,102,579 A * | 8/2000 | Kupietz | 384/572 |
| 6,135,643 A * | 10/2000 | Hattori et al. | 384/589 |
| 6,196,639 B1 * | 3/2001 | Di Ponio et al. | 301/105.1 |
| 6,217,225 B1 * | 4/2001 | Shimizu et al. | 384/589 |
| 6,955,475 B2 * | 10/2005 | Tajima et al. | 384/544 |
| 2002/0114552 A1 * | 8/2002 | Csik | 384/589 |
| 2003/0026511 A1 * | 2/2003 | Csik | 384/589 |
| 2004/0022469 A1 * | 2/2004 | Ozawa et al. | 384/544 |
| 2004/0121847 A1 * | 6/2004 | Fukushima et al. | 464/178 |
| 2004/0158988 A1 * | 8/2004 | Ozawa et al. | 29/898.061 |
| 2007/0031079 A1 * | 2/2007 | Komori et al. | 384/589 |

FOREIGN PATENT DOCUMENTS

| | | |
|---|---|---|
| JP | 2000-211310 | 8/2000 |
| JP | 2001-018605 | 1/2001 |
| JP | 2003-056570 | 2/2003 |
| JP | 2004340242 * | 2/2004 |

* cited by examiner

[Fig 1]
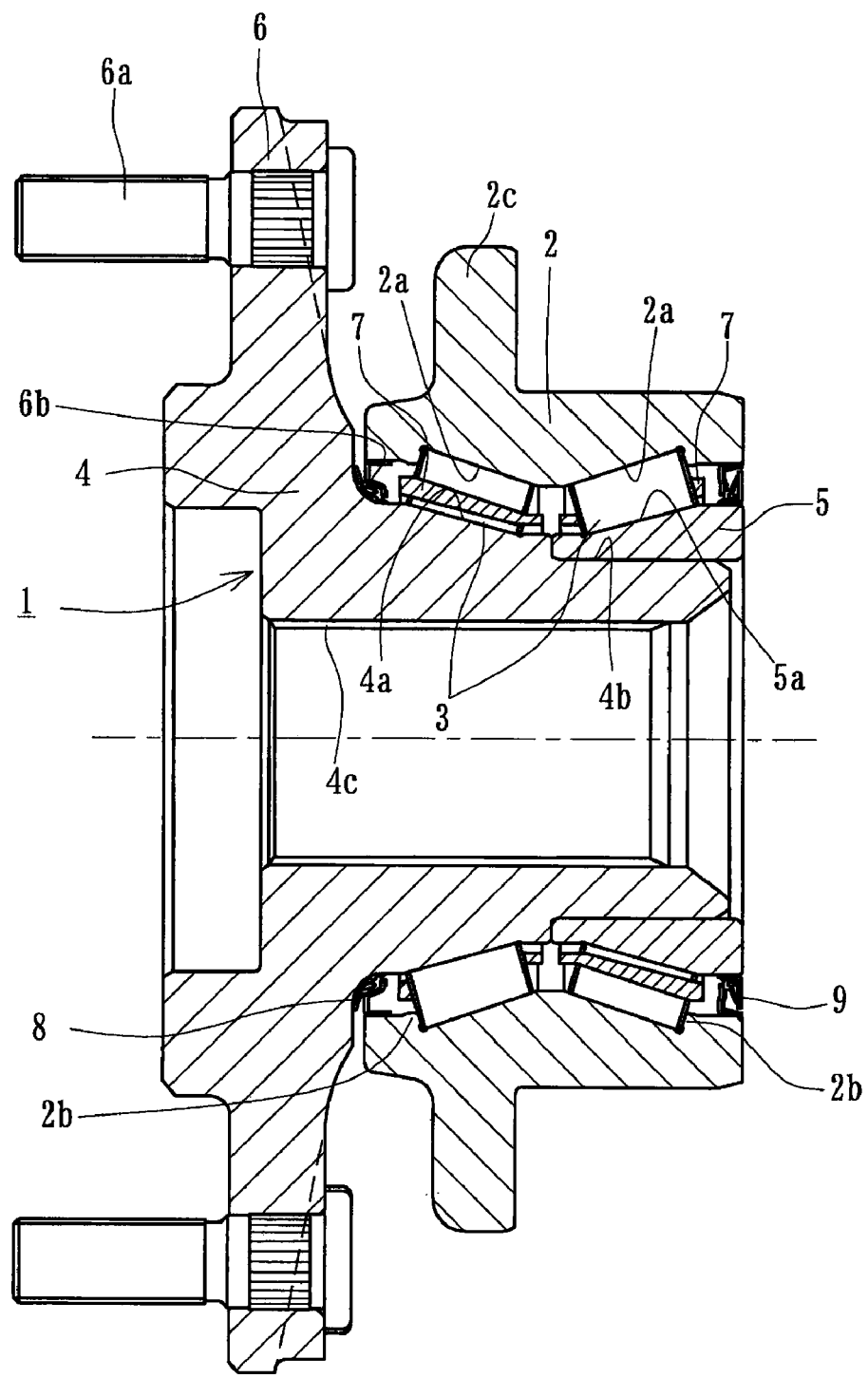

[Fig 2]
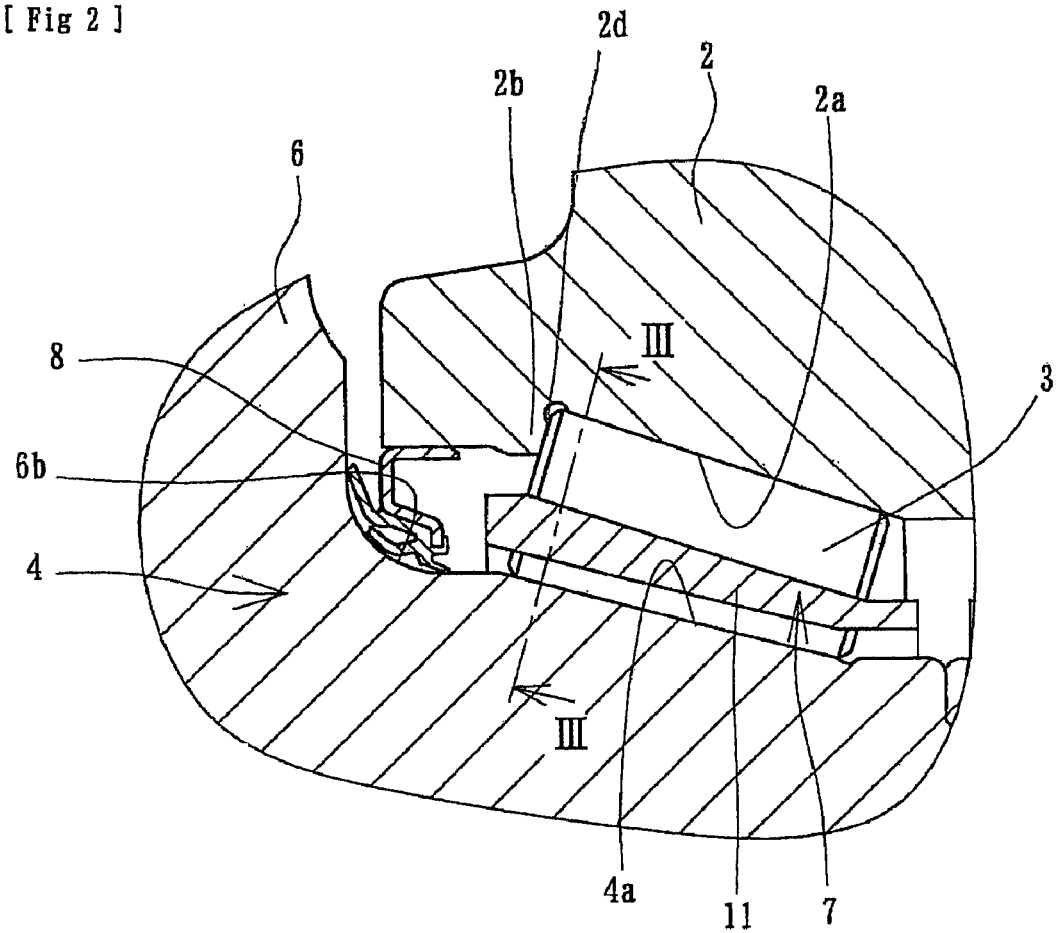
[Fig 3]
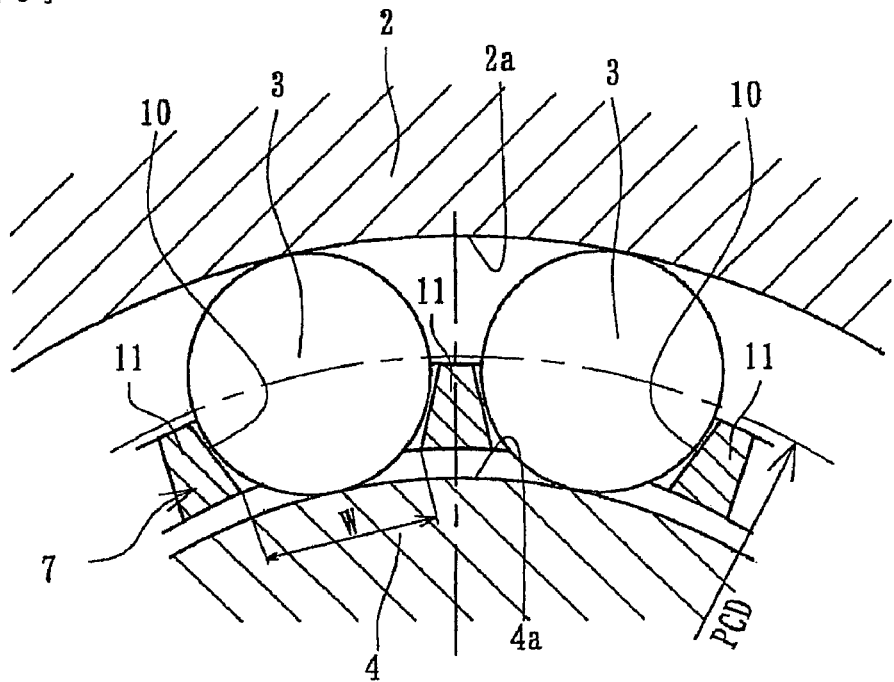

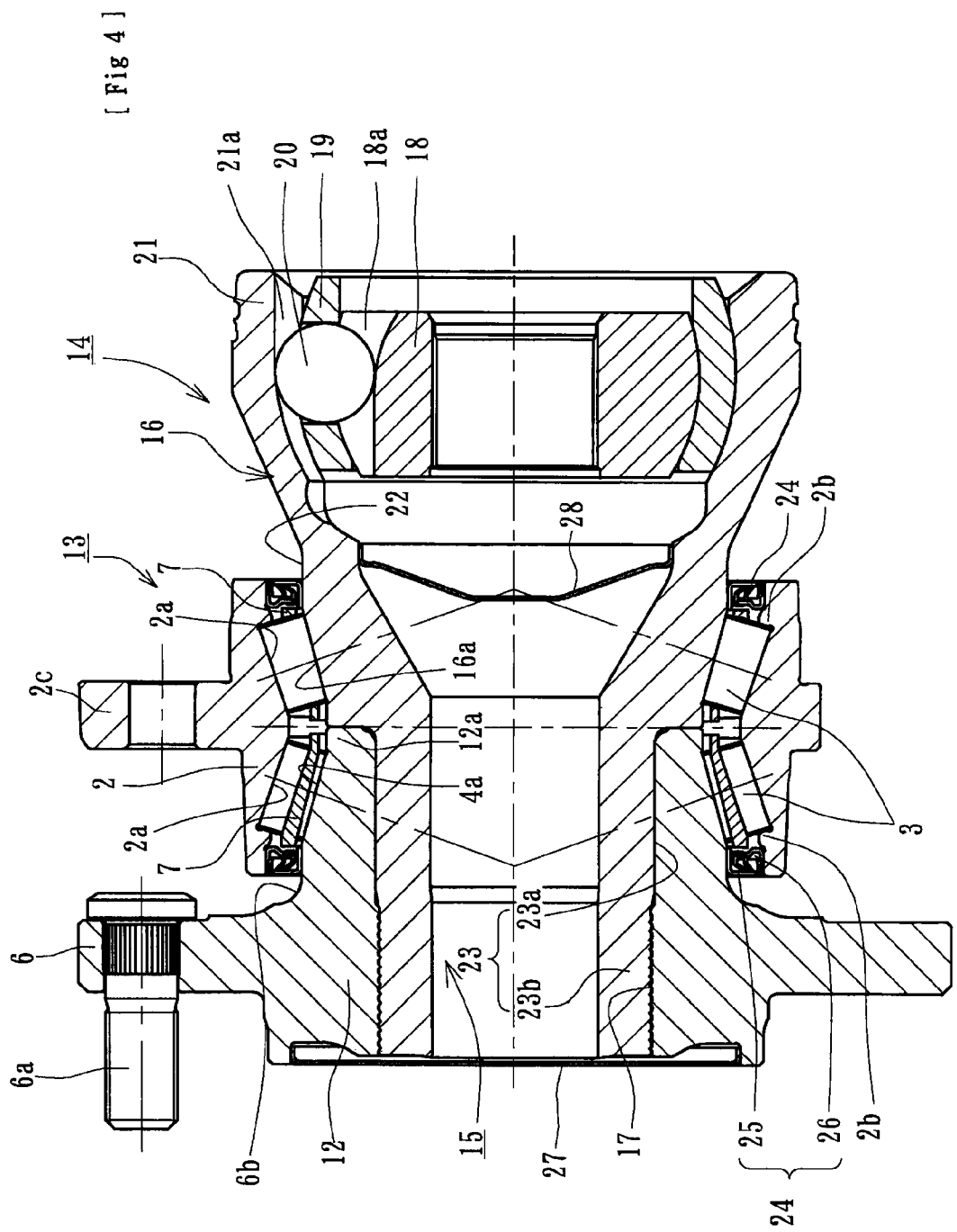
[Fig 4]

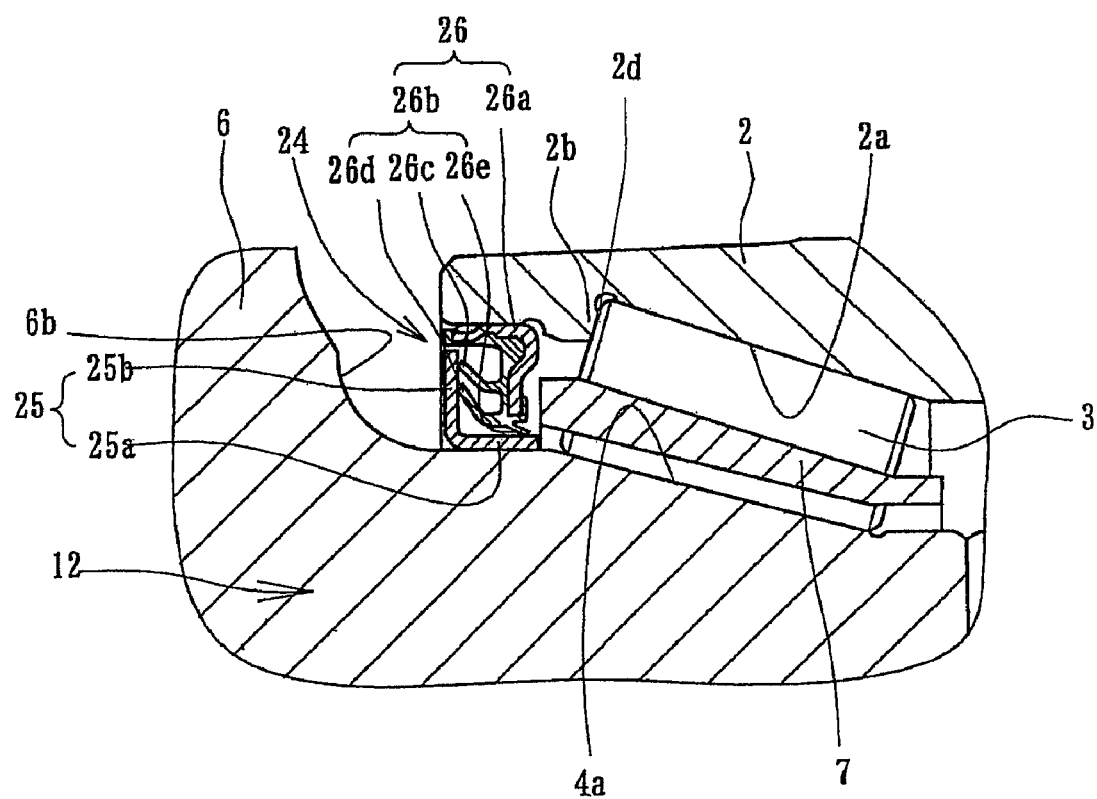
[Fig 5]

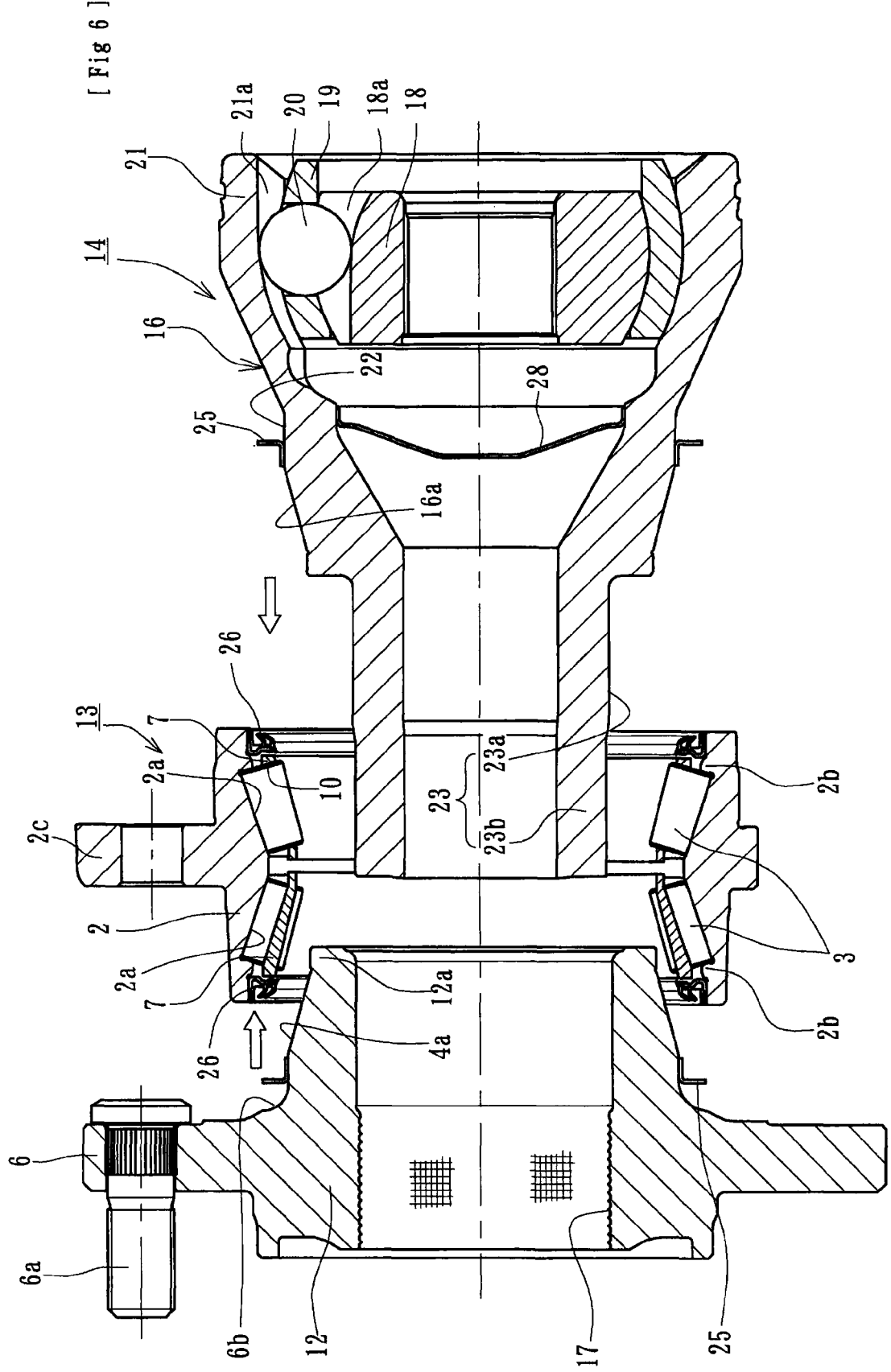

[Fig 7]
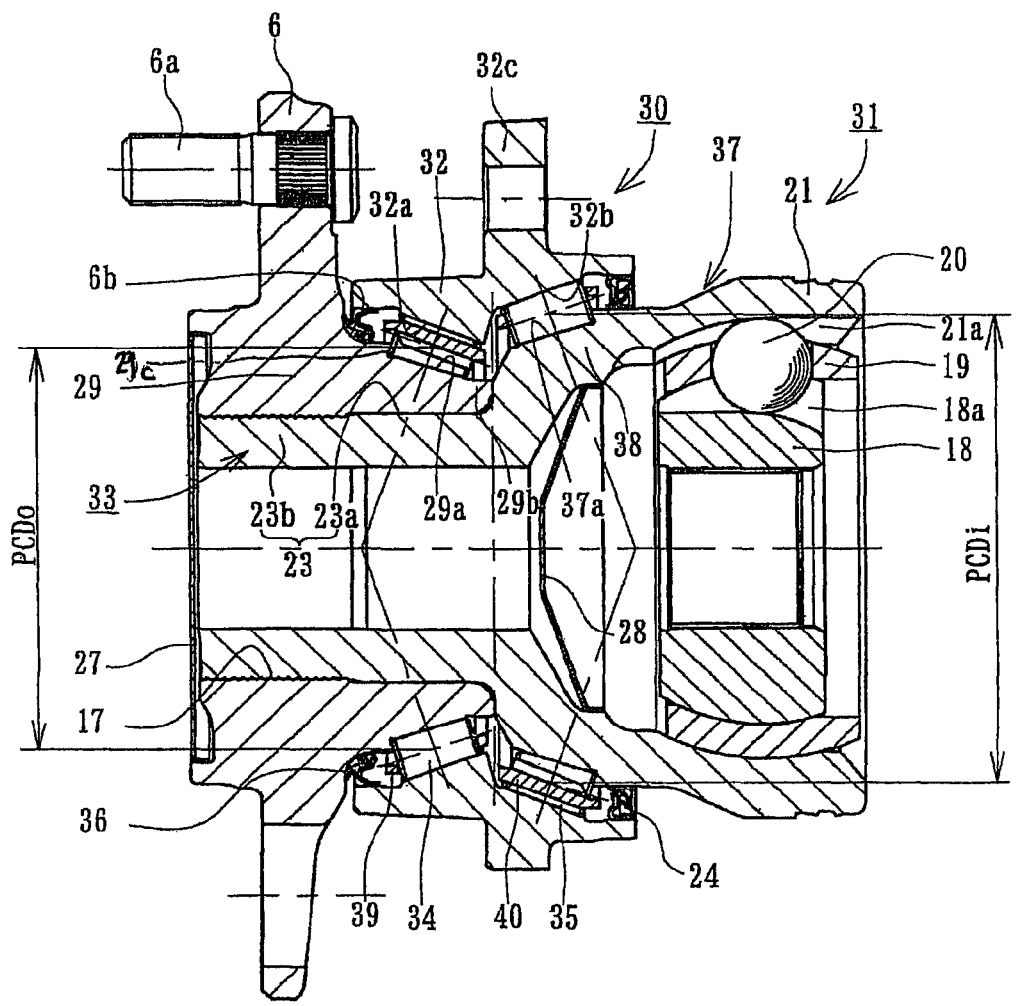

[Fig 8]
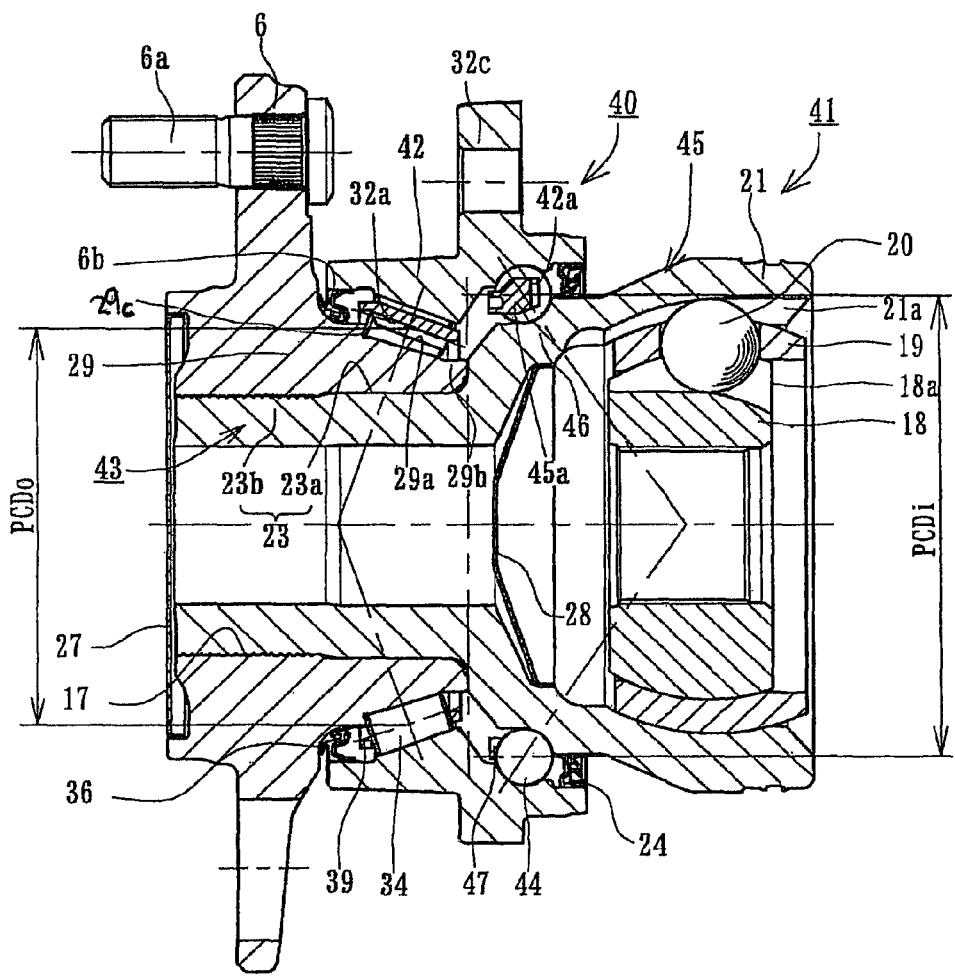

[Fig 9]
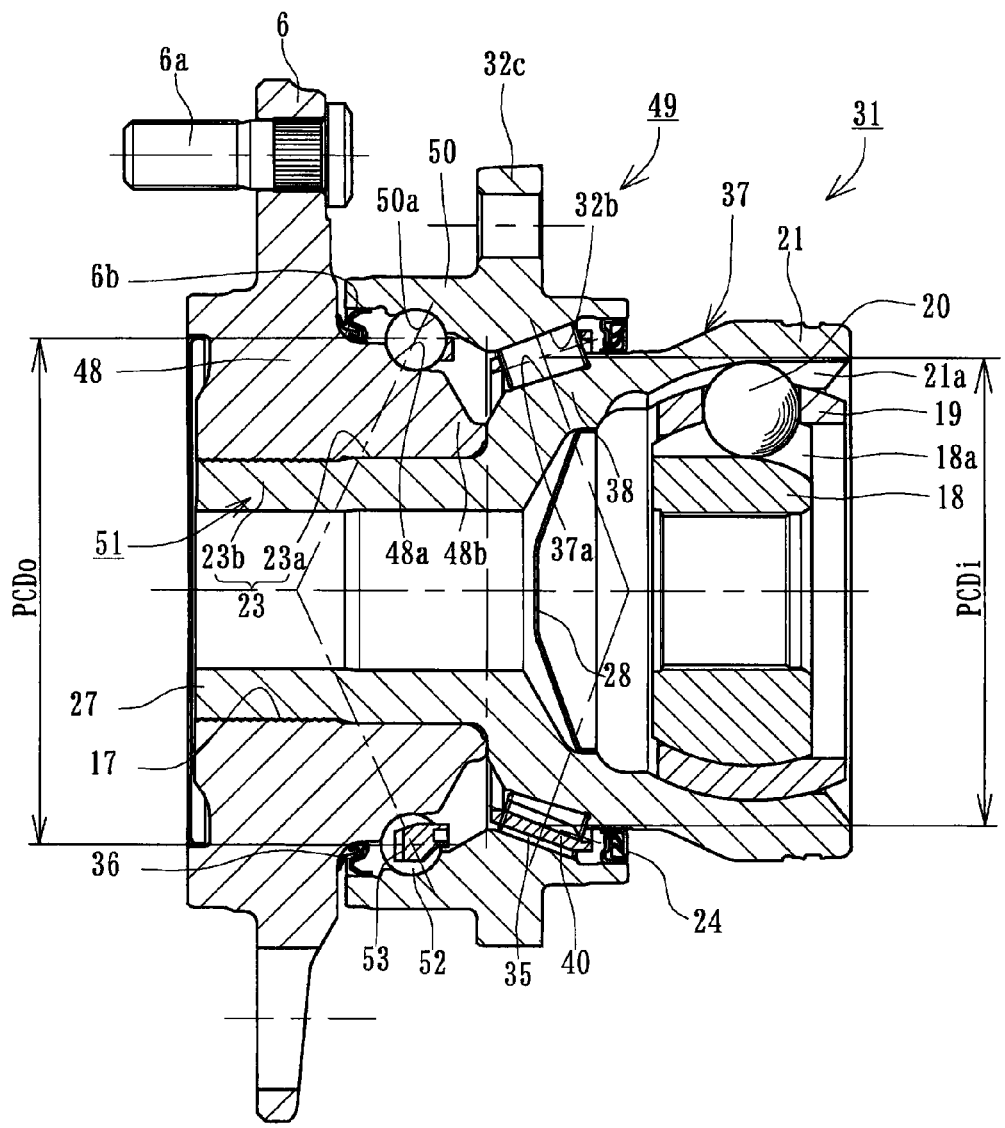

[Fig 10]
PRIOR ART
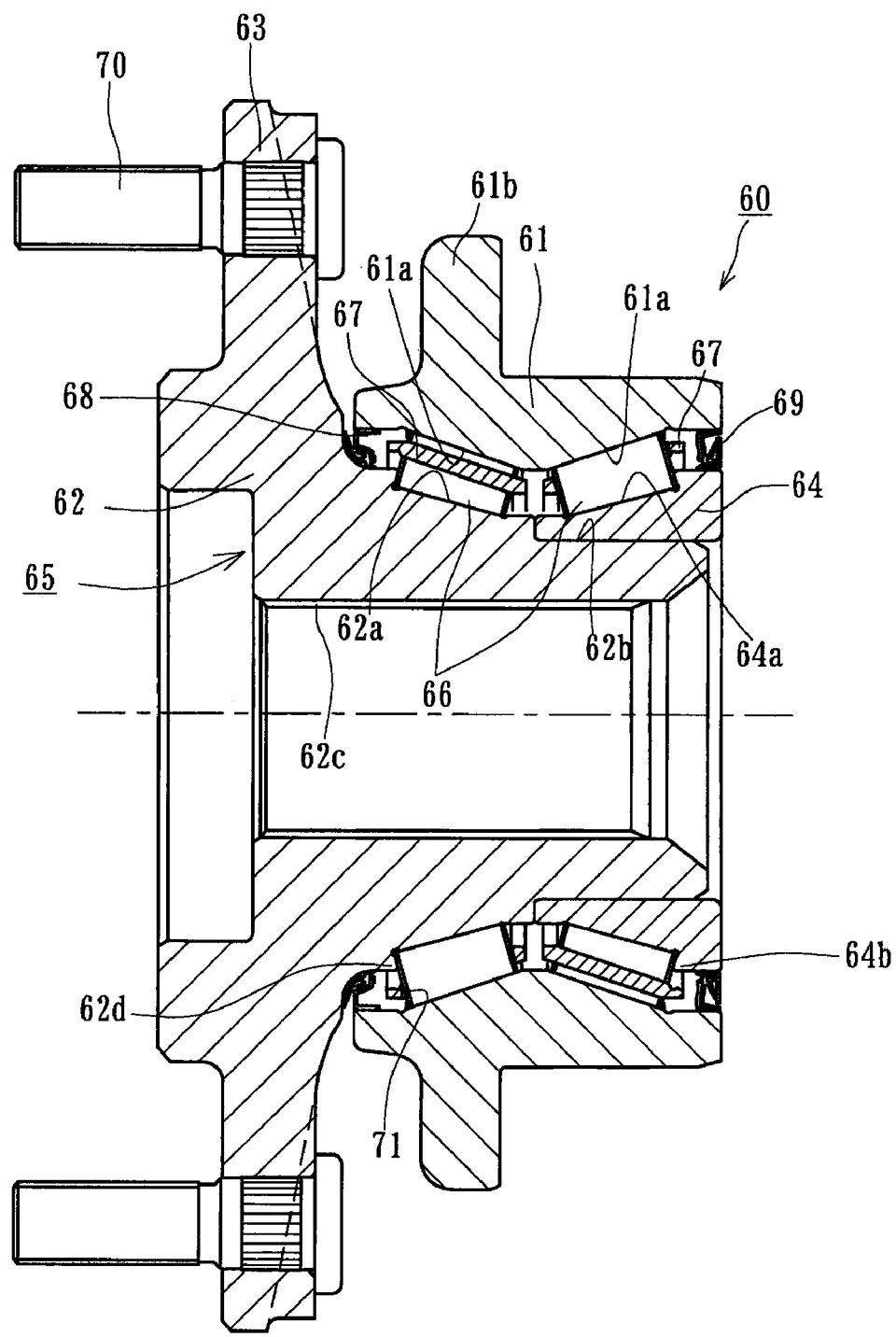

[ Fig 11 ]
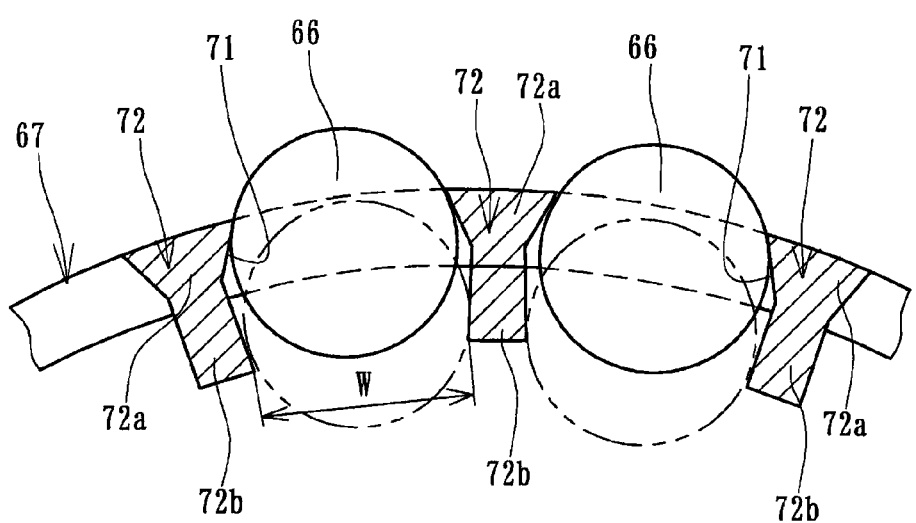

US 7,857,521 B2

BEARING APPARATUS FOR A WHEEL OF VEHICLE

CROSS-REFERENCE TO RELATED APPLICATIONS

This application is a continuation of International Application No. PCT/JP2006/322190, filed Nov. 7, 2006, which claims priority to Japanese Application Nos. 2005-322323, filed Nov. 7, 2005; 2005-327434, filed Nov. 11, 2005; and 2005-327436, filed Nov. 11, 2005. The disclosures of the above applications are incorporated herein by reference.

FIELD

The present disclosure relates to a bearing apparatus with a tapered roller bearing freely rotatably supporting a vehicle wheel and, more particularly, to a vehicle wheel bearing apparatus intended to reduce weight and size of the wheel bearing apparatus.

BACKGROUND

Vehicle wheel bearing apparatus is adapted to freely rotatably support a wheel hub to mount the wheel via a rolling bearing. It may include an inner ring rotation type for a driving wheel and both inner ring rotation and outer ring rotation types for a driven wheel. Double row angular ball bearings are widely used in such bearing apparatus since they have desirable bearing rigidity, high durability against misalignment, and small rotation torque required for fuel consumption. On the contrary double row tapered roller bearings are widely used for off-road vehicles, trucks and heavy duty vehicles.

The vehicle wheel bearing apparatus is broadly classified into a first, second, third or fourth generation structure. The first generation has a wheel bearing of double row angular contact ball type fit between a knuckle, forming part of a suspension, and a wheel hub. The second generation has a body mounting flange or a wheel mounting flange directly formed on the outer circumferential surface of an outer member. The third generation has one of the inner raceway surfaces directly formed on the outer circumferential surface of the wheel hub. The fourth generation structure has the inner raceway surfaces directly formed on the outer circumferential surfaces of the wheel hub and the constant velocity universal joint.

The vehicle wheel bearing apparatus with a double row tapered roller bearing apparatus is usually used in heavy duty vehicles such as trucks. Thus, it is not required to reduce the weight and size of the bearing apparatus. Accordingly, development of the double row tapered roller bearing apparatus has been stayed in use for the second generation structure as compared with the development of the double row angular ball bearing. However, since demand for wagon type vehicles has recently increased and thus multiple functions of vehicles are desired, it is desirable to reduce the weight and size in the double row tapered roller bearing apparatus having a large load capacity.

One example of a prior art wheel bearing apparatus is shown in FIG. 10. The vehicle wheel bearing apparatus 60 is formed by a double row tapered roller bearing having an outer member 61 with a body mounting flange 61b integrally formed on its outer circumferential surface. The body mounting flange 61b is mounted on a knuckle (not shown) of a vehicle. The outer member inner circumferential surface includes double row outer raceway surfaces 61a, 61a. An inner member 65 is integrally formed with double row inner raceway surfaces 62a, 64a on its outer circumferential surface arranged opposite to the double row outer raceway surfaces 61a, 61a. Double row tapered rollers 66, 66 are freely rollably contained between the outer raceway surfaces 61a, 61a and inner raceway surfaces 62a, 64a. Cages 67, 67 freely rollably hold the double row tapered rollers 66, 66.

The inner member 65 has a wheel hub 62 with a wheel mounting flange 63 integrally formed at one end. One inner raceway surface 62a is formed on the outer circumferential surface opposite to one of the double row outer raceway surfaces 61a, 61a. A cylindrical portion 62b axially extends from the one inner raceway surface 62a. A serration 62c, for torque transmission, is formed on the inner circumferential surface. An inner ring 64 is press fit onto the cylindrical portion 62b. The inner ring 62 is formed with the other inner raceway surface 64a on its outer circumferential surface opposite to the other of the double row outer raceway surfaces 61a, 61a. Thus, the inner member 65 forms a third generation wheel bearing apparatus structure for driving a driving wheel.

In addition, hub bolts 70 are adapted to be mounted on the wheel mounting flange 63 equidistantly along its outer periphery. Furthermore seals 68, 69 are mounted in annular openings formed between the outer member 61 and the inner member 65. The seals prevent leakage of grease contained within the bearing apparatus and entry of rain water or dusts into the bearing apparatus from the outside.

Large flanges 62d, 64b, for guiding the tapered rollers 66, are formed at larger side ends of the inner raceway surfaces 62a, 64a of wheel hub 62 and inner ring 64, respectively. However, no small flange is formed on the smaller side ends of the inner raceway surfaces 62a, 64a to prevent falling out of the tapered rollers. Accordingly, the cages 67 keep the tapered rollers 66 from a falling out condition by having the rollers 66 receiving pockets 71 in a pre-assembling condition. That is, as shown in FIG. 11, the cage 67 is formed of synthetic resin by injection molding. Posts 72 are formed between mutually adjacent pockets 71, 71 so that each of them has a trapezoidal cross section. Thus, the radially outward portion 72a is convergent tapered radially inward. A radially inward projection 72b is integrally formed with the post.

The width of a pocket 71 between the radially outward portions 72a, 72a is set so that the tapered roller 66 cannot radially outwardly fall out without it being contacted by the tapered surfaces of the posts 72. On the other hand, the width "W" between the radially inward projections 72b, 72b is set so that it is slightly smaller than the diameter of the tapered roller 66. Thus, each tapered roller 66 can be press fit radially inwardly into the pocket 71. Thus, it cannot inadvertently radially inwardly fall out since it is contacted by the radially inward projections 72b, as shown by a two-dot chain line. Accordingly, the cage structure 67 not only reduces the number of parts and manufacturing cost but makes it easy to assemble the bearing apparatus in an automatic assembling apparatus as well as eliminating assembling steps of the bearing apparatus (see Japanese Laid-open Patent Publication No. 44322/1999).

SUMMARY

In the prior art wheel bearing apparatus 60, the cages 67 are formed so that the radially inward projections 72b prevent inadvertent falling out of the tapered rollers 66, radially inward, with the rollers 66 contacted by the radially inward projections 72b. However if the width "W" between the mutually adjacent projections 72b, 72b is set small it will be difficult to push the rollers 66 into the pockets 71. Accordingly, the entrance width "W" of balls should be strictly formed at the predetermined dimension without dimensional variation in order to prevent the falling out of the tapered rollers 66. However, the ability to injection mold the cages 67 to achieve strict dimensional accuracy of the width "W" in mass production is limited. In addition, since the cage 67 is a type where the rollers 66 can be inserted into the pockets 71 by elastically deforming the radially inward projections 72*b*, it is difficult to simultaneously insert the rollers 66 into the pockets 71 and thus the number of assembling steps is increased. Accordingly, it is difficult to achieve easy assembly in an automatic assembling apparatus as well as to greatly reduce assembling steps.

It is, therefore, an object of the present disclosure to provide a vehicle wheel bearing apparatus that can achieve ease of assembly in an automatic assembling apparatus as well as to greatly reduce assembling steps. Also, it is an object to provide a vehicle wheel bearing apparatus that can improve the sealing ability of the bearing apparatus. In addition, it is an object to provide a vehicle wheel bearing apparatus that can reduce weight and size and increase the rigidity of the bearing apparatus.

A vehicle wheel bearing apparatus with a back-to-back double row tapered roller bearing comprises an outer member integrally formed with a body mounting flange on its outer surface. The body mounting flange is mounted on a suspension apparatus of a vehicle. The outer member inner surface is formed with double row outer raceway surfaces tapered open, respectively, axially inward and outward. An inner member includes a wheel hub and an inner ring or an outer joint member of a constant velocity universal joint. The wheel hub has a wheel mounting flange integrally formed at one end. One inner raceway surface is formed on the outer circumferential surface of the inner ring and is arranged opposite to one of the double row outer raceway surfaces. A cylindrical portion axially extends from the inner raceway surface. The inner ring and inner ring of the outer joint member of a constant velocity universal joint is press fit onto the cylindrical portion. They are formed with the other inner raceway surface on its outer circumferential surface arranged opposite to the other raceway surface of the double row outer raceway surfaces. Double row tapered rollers are freely rollably held between the outer and inner raceway surfaces by cages. Seals are arranged in annular openings formed by the outer and inner members at both ends. The cages are formed of synthetic resin by injection molding. Posts between pockets of the cages are arranged to be positioned radially inward of the pitch circle diameter of the tapered rollers. The width of an opening of radially inward of each pocket is set so that each tapered roller is held within the pocket. Contacting tapered surfaces of the posts are opened radially outward to prevent fall out radially inward.

A vehicle wheel bearing apparatus with a back-to-back double row tapered roller bearing having a third or fourth generation type structure comprises an outer member integrally formed with a body mounting flange on its outer surface and with double row outer raceway surfaces on its inner surface. An inner member includes a wheel hub with a wheel mounting flange integrally formed at one end and one inner raceway surface formed on the outer circumferential surface or an outer joint member of a constant velocity universal joint. Double row tapered rollers are freely rollably held between the outer and inner raceway surfaces by cages. Seals are arranged in annular openings formed by the outer and inner members at both ends. The cages are formed of synthetic resin by injection molding. Posts between pockets of the cages are arranged radially inward of the pitch circle diameter of the tapered rollers. The width of an opening radially inward of each pocket is set so that each tapered roller is held within the pocket. Contacting tapered surfaces on the posts are open radially outward so that fall out radially inward does not occur. Thus, it is possible to prevent falling out of the tapered rollers from the cages by holding the tapered rollers by the outer raceway surfaces of the outer member and the cages without strict control of the dimensional accuracy of the cages. Accordingly, it is also possible to achieve ease of assembly in an automatic assembling apparatus as well as to greatly reduce assembling steps.

A vehicle wheel bearing apparatus with back-to-back double row tapered roller bearings comprises an outer member integrally formed with a body mount flange on its outer surface. The body mounting flange is mounted on a vehicle suspension apparatus. Also, the outer member inner surface includes double row outer raceway surfaces tapered open, respectively, axially inward and outward. An inner member includes a wheel hub and an inner ring or an outer joint member of a constant velocity universal joint. The wheel hub has a wheel mounting flange integrally formed at one end. One inner raceway surface is formed on the outer circumferential surface of the wheel hub arranged opposite to one of the double row outer raceway surfaces. A cylindrical portion axially extends from the inner raceway surface. The inner ring is press fit onto the cylindrical portion and is formed with the other inner raceway surface on its outer circumferential surface arranged opposite to the other raceway surface of the double row outer raceway surfaces. Double row tapered rollers are freely rollably held between the outer and inner raceway surfaces by cages. Seals are arranged at both ends in annular openings formed by the outer and inner members. The cages are formed of synthetic resin by injection molding. The tapered rollers are held within the pocket so that radially inward fall out does not occur. Larger flanges for guiding the tapered rollers are integrally formed on larger diameter sides of the outer raceway surfaces of the outer member.

A vehicle wheel bearing apparatus with back-to-back double row tapered roller bearings and a third or fourth generation type structure comprises an outer member integrally formed with a body mounting flange on its outer surface and on its inner surface with double row outer raceway surfaces. An inner member includes a wheel hub with a wheel mounting flange integrally formed at one end. One inner raceway surface is formed on the wheel hub outer circumferential surface or on an outer joint member of a constant velocity universal joint. Double row tapered rollers are freely rollably held between the outer and inner raceway surfaces by cages. Seals are arranged at both ends in annular openings formed by the outer and inner members. The cages are formed of synthetic resin by injection molding. The tapered rollers are held within the pocket so that radially inward fall out does not occur. Larger flanges guiding the tapered rollers are integrally formed on larger diameter sides of the outer raceway surfaces of the outer member. Thus, it is possible to prevent the tapered rollers from falling out of the cages during assembly of the bearing apparatus. Also, it is possible to prevent the seals from being interfered withby movement of the cages under a condition where the roller assembly is inserted into the outer member. Accordingly, it is possible to provide a wheel bearing apparatus that improves the ease of assembly of the bearing apparatus and its sealing ability.

A vehicle wheel bearing apparatus is formed as a unit. It includes a wheel hub, a rolling bearing and a constant velocity universal joint and an outer member formed with double row outer raceway surfaces on its inner surface. An inner member includes a wheel hub and an outer joint member. The wheel hub has a wheel mounting flange integrally formed at one end. One inner raceway surface is formed on the outer circumferential surface and is arranged opposite to one of the double row outer raceway surfaces. A cylindrical portion axially extends from said inner raceway surface. The outer joint member is fit into the wheel hub. The outer joint member is formed with the other inner raceway surface on its outer circumferential surface arranged opposite to the other raceway surface of the double row outer raceway surfaces. A shaft portion axially extends from the other inner raceway surface. Double row rolling elements are freely rollably held between the outer and inner raceway surfaces. A pitch circle diameter of the outer side rolling elements of the double row rolling elements is different from the pitch circle diameter of the inner side rolling elements of the double row rolling elements. The number of the rolling elements in the larger pitch circle diameter is set larger than the number of rolling elements in the smaller pitch circle diameter. Accordingly, it is possible to provide a wheel bearing apparatus that can increase rigidity and also reduce the weight and size of the wheel bearing apparatus.

The inner member comprises the wheel hub and the outer joint member fit into the wheel hub. The outer joint member is integrally formed with a cup-shaped mouth portion and a shoulder portion that includes the other inner raceway surface on the outer circumferential surface. A shaft portion axially extends from the shoulder portion. The wheel hub and the outer joint member are united by plastically deforming a hollow end of the shaft portion and caulking it onto the wheel hub. According to such a structure, since the wheel hub and the outer joint member are united via plastically deformed connection, it is possible to eliminate the pre-load amount by adjusting the fastening nut amount, as in a conventional manner. Thus, it is possible to maintain the pre-load amount for a long term and to increase the strength and durability of the wheel hub.

The wheel hub and the outer joint member are united by radially outwardly expanding the hollow end of the shaft portion of the outer joint member. It bites into a hardened irregular portion formed on an inner circumferential surface of the wheel hub. This structure enables a further reduction in weight and size of the bearing apparatus due to the plastically deformed connection between the wheel hub and the outer joint member.

The inner member comprises the wheel hub and the inner ring press fit onto the cylindrical portion of the wheel hub via a predetermined interference. An inner side base portion of the wheel mounting flange is rounded. Its surface on which the seal directly contacts is hardened. Such a structure enables a reduction in size of the bearing apparatus and obtains a sufficient mechanical strength against the rotary bending load applied to the wheel mounting flange.

An inner side seal comprises a slinger press fit onto the inner member. An annular sealing plate, including a metal core, is press fit into the outer member. A sealing member is integrally adhered to the metal core via vulcanized adhesion. Each slinger and metal core has a substantially "L" shaped cross section and are arranged opposite toward each other so that the sealing member slidingly contacts the slinger. This structure keeps a high sealing ability for a long time.

At least the rolling elements of the smaller pitch circle diameter of the double row rolling elements is a tapered roller. This structure provides high rigidity to the wheel bearing apparatus.

The double row rolling elements are tapered rollers each having the same specifications. This eliminates erroneous assembly of the tapered rollers and thus reduces the manufacturing cost and improves the reliability of the bearing apparatus.

The rolling elements of the larger pitch circle diameter of the double row rolling elements are balls. This enables a further reduction of the axial size of the wheel bearing apparatus while keeping balance of the loading capacity or the rigidity of the double bearing rows.

A vehicle wheel bearing apparatus with a back-to-back double row tapered roller bearing comprises an outer member integrally formed with a body mounting flange on its outer surface. The body mounting flange is mounted on a vehicle suspension. The outer member inner surface includes double row outer raceway surfaces tapered openly, respectively, axially inward and outward. An inner member includes a wheel hub and an outer joint member of a constant velocity universal joint. The wheel hub has a wheel mounting flange integrally formed at one end. One inner raceway surface is formed on its outer circumferential surface and is arranged opposite to one of the double row outer raceway surfaces. A cylindrical portion axially extends from the inner raceway surface. The outer joint member of the constant velocity universal joint is press fit onto the cylindrical portion. The outer joint member is formed with the other inner raceway surface on its outer circumferential surface arranged opposite to the other raceway surface of the double row outer raceway surfaces. Double row tapered rollers are freely rollably held between the outer and inner raceway surfaces by the cages. Seals are arranged at both ends in annular openings formed by the outer and inner members. The outer joint member is formed with a shoulder portion directly formed on its outer circumferential surface. A cylindrical shaft portion axially extends from the shoulder portion. The wheel hub and the outer joint member are united by radially outwardly expanding the hollow end of the shaft portion of the outer joint member. The shaft bires into a hardened irregular portion formed on an inner circumferential surface of the wheel hub. The cages are formed of synthetic resin by injection molding. Posts between pockets of the cages are arranged to be positioned radially inward of the pitch circle diameter of the tapered rollers. The width of an opening radially inward of each pocket is set so that each tapered roller is held within the pocket. Contacting tapered surfaces of the posts are opened radially outwardly to prevent radially inward fall out.

DRAWINGS

Additional advantages and features of the present disclosure will become apparent from the subsequent description and the appended claims, taken in conjunction with the accompanying drawings, wherein:

FIG. 1 is a longitudinal section view of a vehicle wheel bearing apparatus.

FIG. 2 is a partial enlarged view of FIG. 1.

FIG. 3 is an enlarged cross sectional view taken along line III-III of FIG. 2.

FIG. 4 is a longitudinal section view of a second embodiment of a vehicle wheel of the bearing apparatus.

FIG. 5 is a partial enlarged view of FIG. 4.

FIG. 6 is an exploded section view showing a method of assembling the vehicle wheel bearing apparatus of FIG. 4.

FIG. 7 is a longitudinal section view of the third embodiment of a vehicle wheel bearing apparatus.

FIG. 8 is a longitudinal section view of a fourth embodiment of a vehicle wheel bearing apparatus.

FIG. 9 is a longitudinal section view of a fifth embodiment of a vehicle wheel bearing apparatus.

FIG. 10 is a longitudinal section view of a prior art vehicle wheel bearing apparatus.

FIG. 11 is an enlarged cross sectional view of a tapered roller assembly of FIG. 10.

DETAILED DESCRIPTION

Preferable embodiments of the present disclosure will be hereinafter described with reference to the drawings.

FIG. 1 is a longitudinal section view of a first embodiment of the vehicle wheel bearing apparatus. FIG. 2 is a partially enlarged view of FIG. 1. FIG. 3 is an enlarged cross sectional view taken along line III-III of FIG. 2. In the description below, the term "outer side" (left hand side in the drawings) of the apparatus denotes a side that is positioned outside of the vehicle body. The term "inner side" (right hand side in the drawings) of the apparatus denotes a side that is positioned inside of the body when the bearing apparatus is mounted on the vehicle body.

This wheel bearing apparatus shown in FIG. 1 is a third generation type used for a driving wheel. It includes an inner member 1, an outer member 2, and double row tapered rollers 3, 3 that are rollably contained between the inner and outer members 1, 2. The inner member 1 includes a wheel hub 4 and an inner ring 5 press fit onto the wheel hub 4 with a predetermined interference.

The wheel hub 4 is integrally formed with a wheel mounting flange 6 at one end. One (outer side) tapered inner raceway surface 4a is on the outer circumferential surface of the wheel hub 4. A cylindrical portion 4b axially extends from the inner raceway surface 4a. A serration (or spline) 4c is on the inner circumferential surface of the wheel hub 4. Hub bolts 6a are arranged on the wheel mounting flange 6 equidistantly along the periphery of the wheel mounting flange 6. The inner ring 5 is formed with the other (inner side) tapered inner raceway surface 5a on its outer circumferential surface. The inner ring 5 is adapted to be press fit onto the cylindrical portion 4b of the wheel hub 4. The inner ring 5 and the tapered rollers 3 are made of high carbon chrome bearing steel, such as SUJ 2, and are hardened to their core by dip quenching to have a hardness of 58~64 HRC. No large flange, for guiding the rollers, or small flange, for holding the rollers, of the prior art is formed on the ends of the inner raceway surfaces 4a, 5a of the wheel hub 4 and the inner ring 5. Instead large flanges 2b are integrally formed adjacent the outer raceway surfaces 2a, 2a of the outer member 2, which will be described later.

The wheel hub 4 is made of medium/high carbon steel including carbon of 0.40~0.80% by weight, such as S53C, and is hardened by high frequency induction quenching. A region including the inner raceway surface 4a, a circular arc base 13b formed on the inner side of the wheel mounting flange 6 and the cylindrical portion 4b has a surface hardness of 58~64 HRC. Accordingly, wear resistance of the base 6b forming a seal land portion of the seal 8 is improved. The wheel mounting flange 6 has a sufficient mechanical strength against the rotary bending load applied to it. The anti-fretting strength of the cylindrical portion 4b can be improved at a region press fit by the inner ring 5.

The outer member 2 is integrally formed with a body mounting flange 2c on its outer circumferential surface. The body mounting flange 2c is mounted on a knuckle (not shown) of a vehicle. The inner circumferential surface of the outer member is formed with tapered outer raceway surfaces 2a, 2a that are outwardly opened and arranged opposite to the double row inner raceway surfaces 4a, 5a of the inner member 1. Double tapered rollers 3, 3 are contained between the outer and inner raceway surfaces and are rollably held by cages 7, 7. The outer member 2 is made of medium/high carbon steel including carbon of 0.40~0.80% by weight, such as S53C. The double row outer raceway surfaces 2a, 2a are hardened by high frequency induction quenching to have a surface hardness of 58~64 HRC.

Seals 8, 9 are mounted within annular spaces formed between the outer member 2 and the inner member 1. Seals 8, 9 are formed by a so-called pack seal. The outer side seal 8 sliding contacts the base 6b of the wheel mounting flange 6. The inner side seal 9 is mounted on the inner circumferential surface of the outer member 2 and on the outer circumferential surface of the inner ring 5. These seals 8, 9 prevent leakage of grease contained in the bearing. Additionally, they prevent entry of rain water and dusts into the bearing from the outside. Although the structure shown here is of a third generation bearing for a driving wheel, the present disclosure is not limited to use for a driving wheel and can be applied to a driven wheel if the bearing apparatus has a construction where the inner raceway surfaces are formed on the wheel hub.

According to the first embodiment, the outer member 2 is integrally formed with the large flange 2b on the larger diameter end of the outer raceway surface 2a as shown in the enlarged view of FIG. 2. The outer side seal 8 is fit on the inner circumferential surface of the large flange 2b. The cages 7 are formed by injection molding of base thermoplastic resin such as PA (polyamide) 66 into which reinforcing material such as GF (glass fiber) is added. Each cage 7 is constructed as shown in FIG. 3 so that the posts 11 between mutually adjacent pockets 10, 10 of the cage 7 are arranged to be positioned radially inward of the pitch circle diameter (PCD) of the tapered rollers 3. The width "W" of an opening of radially inward of each pocket 10 is set so that each tapered roller 3 is held within the pocket. The contacting tapered surfaces of the posts 11 are opened radially outward so that the roller does not fall out radially inward. Accordingly, this makes it possible to prevent the tapered rollers 3 from falling out from the cages 7. The rollers 3 are held by the outer raceway surfaces 2a of the outer member 2 without controlling the dimensional accuracy of the cages 7.

The assembly of the bearing can be easily achieved by inserting or fitting the posts 11 of the cage 7 between the adjacent rollers 3 from radially inward so that the rollers 3 are simultaneously fitted into the pockets 10. The wheel hub 4 and the inner ring 5 are inserted from both sides of the outer member 2 where the taper rollers are assembled. Thus, it is possible to achieve easy assembly in an automatic assembling apparatus and to substantially reduce the assembling steps.

In addition since the large flange 2b includes a cone back face rib 2d for guiding the rollers 3 that is formed on the larger diameter side of the outer raceway surface 2a of the outer member 2, the cage 7 cannot axially move toward the seal 8, as in the prior art under a condition where the tapered rollers 3 are assembled in the outer member 2. Thus, it is possible to prevent the seal 8 from being interfered with by the cage 7 and accordingly from being deformed or damaged and thus detracted from its sealing ability.

FIG. 4 is a longitudinal section view of a second embodiment of the vehicle wheel bearing apparatus. FIG. 5 is a partially enlarged view of FIG. 4. FIG. 6 is an exploded cross sectional view of a method for assembling the vehicle wheel bearing apparatus. The same reference numerals are used herein to designate the same parts as those having the same functions used in the first embodiment.

This wheel bearing apparatus is a fourth generation type. It is formed as a unit with a wheel hub 12, a double row rolling bearing 13 and a constant velocity universal joint 14. The double row rolling bearing 13 includes an inner member 15, the outer member 2, and double row tapered rollers 3, 3 rollably contained between the inner and outer members 15, 2. The inner member 15 includes the wheel hub 12 and an outer joint member 16 fit into the wheel hub 12 and connected thereto via plastic deformation of the outer joint member 16.

The wheel hub 12 is integrally formed with a wheel mounting flange 6 at one end. One (outer side) tapered inner raceway surface 4a is on the outer circumferential surface of the wheel hub 12. A cylindrical portion 12a axially extends from the inner raceway surface 4a. The wheel hub 12 is made of medium/high carbon steel including carbon of 0.40~0.80% by weight, such as S53C, and is hardened by high frequency induction quenching. A region including the inner raceway surface 4a, the inner side base 6b inner side of the wheel mounting flange 6 and the cylindrical portion 12a has a surface hardness of 58~64 HRC. Accordingly, the wheel hub 12 has a sufficient mechanical strength against a rotary bending load applied to the wheel mounting flange 6.

The inner circumferential surface of the wheel hub 12 is formed with an irregular portion 17 that is heat treated to have a surface hardness of HRC 54~64. It is preferable to use high frequency induction heating as the heat treatment that can easily be carried out by local heating and setting of the depth of the hardened layer. The irregular portion 17 is formed with a crisscross knurl pattern. It includes an orthogonally crossed grooves formed by a plurality of independent annular grooves formed, by turning, and a plurality of axial grooves, formed by broaching, or a crossing groove, formed by mutually inclined spiral grooves. Preferably each tip projection of the irregular portion 17 is formed by a pointed configuration such as a pyramid.

The constant velocity universal joint 14 has the outer joint member 16, a joint inner ring 18, a cage 19 and torque transmitting balls 20. The outer joint member 16 is made of medium carbon steel including carbon of 0.40~0.80% by weight, such as S53C. The joint 14 is integrally formed with a cup shaped mouth portion 21. A shoulder 22 forms a bottom of the mouth portion 21. A cylindrical shaft portion 23 axially extends from the shoulder 22. The shaft portion 23 is formed by a spigot portion 23a fit into the wheel hub 12 via a predetermined radial gap. A fitting portion 23b is at the end of the spigot portion 23a.

An inner surface of the mouth portion 21 is formed with curved track grooves 21a. An outer surface of the joint inner ring 18 is formed with track grooves 18a corresponding to the track grooves 21a. The torque transmitting balls 20 are contained between the track grooves 21a, 18a, via the cage 19. An outer circumferential surface of the shoulder 22 is formed with an inner side tapered inner raceway surface 16c opposed to one of the double row outer raceway surface 2a, 2a. The track grooves 21a and a region including a seal fit portion to which a seal 24, mentioned later, sliding contacts, the inner raceway surface 16a and the shaft portion 23 are hardened by the high frequency induction heating to have a surface hardness of 58~64 HRC. The fitting portion 23b of the shaft portion 23 is kept as a non-quenched portion after being forged.

A plurality of the double row tapered rollers 3, 3 are contained between the double row outer raceway surfaces 2a, 2a and the double row inner raceway surfaces 4a, 16a opposite to the double row outer raceway surfaces 2a, 2a. The rollers 3, 3 are freely rollably held by the cages 7, 7. The seals 24, 24 are mounted on both ends of the outer member 2. The seals prevent leakage of grease contained in the bearing and entry of rain water and dusts into the bearing from the outside. The double row rolling bearing 13 forms a so-called back-to-back double row tapered roller bearing where the smaller the distance of line of action of force applied to both raceway surfaces 2a, 4a and 2a, 16a from the axial center, the larger the distance between the rollers in their axial direction.

Similarly to the first embodiment large flanges 2b, for guiding the tapered rollers 3, are formed at the larger side ends of the outer raceway surfaces 2a of the outer member 2. Thus, no small flange for holding the rollers and no large flange for guiding rollers are formed at both side ends of the inner raceway surfaces 4a, 16a of the wheel hub 12 and the outer joint member 16. The posts 11 of the cages 7 are positioned radially inward of the pitch circle diameter of the tapered rollers 3. Thus, this prevents the tapered rollers 3 from falling out from the cages 7.

As shown in an enlarged view of FIG. 5 the seal 24 is formed as a so-called pack seal including a slinger 25 and a sealing plate 26. The slinger 25 is press fit onto the base 6b of the wheel mounting flange. The annular sealing plate 26 having a sealing member and a substantially "L" shaped cross section is press fit into the large flange 2b of the outer member 2 opposite to the slinger 25. This prevents the sealing plate 26 from being interfered with by the cage 7 and thus from being deformed or damaged.

The slinger 25 is made of an austenitic stainless steel sheet (JIS SUS 304 etc.) or a preserved cold rolled sheet (JIS SPCC etc.) and is formed with a substantially "L" shaped cross section by press forming the sheet. A cylindrical portion 25a is fit onto the base 6b (shoulder 22) and a standing portion 25b extends radially outward from the cylindrical portion 25a.

The sealing plate 26 has a metal core 26a fit into the end of the outer member 2. A sealing member 26b is integrally adhered to the metal core 26a, via vulcanized adhesion. The metal core 26a is made of an austenitic stainless steel sheet (JIS SUS 304 etc.) or a preserved cold rolled sheet (JIS SPCC etc.) and formed by press forming. The sealing member 26b has a pair of side lips 26c, 26d in sliding contact with the standing portion 25b of the slinger 25. A radial lip 26e is in sliding contact with the cylindrical portion 25a of the slinger 25.

A method for assembling the wheel bearing apparatus of the present embodiment will be described with reference to FIG. 6. The cages 7 are elastically deformed and fitted radially inward into the outer member 2. The tapered rollers 3, 3 are arranged in rows on the outer raceway surfaces 2a, 2a of the outer member 2. The pockets 10 of the cages are arranged to correspond to the double row tapered rollers 3, 3. The sealing plates 26, forming the seal 24, are fit into both ends of the outer member 2. Then slingers 25, forming seal 24, are press fit, respectively, onto the base 6b of the wheel mounting flange 6 and the shoulder 22 of the outer joint member 16. The wheel hub 12 and the outer joint member 16 are fit into the outer member 2 in directions shown by arrows in FIG. 6. The shaft portion 23 of the outer joint member 16 is fit into the wheel hub 12 until the end face of the cylindrical portion 12a of the wheel hub 12 abuts the shoulder 22 of the outer joint member 16. An expanding tool, such as a mandrel, is pushed into a bore of a fitting portion 23b of the shaft portion 23. This radially expands the fitting portion 23b in order to bite the outer circumferential surface of the fitting portion 23b into the irregular portions 17 of the wheel hub 12. Thus, the wheel hub 12 and the outer joint member 16 are integrally united via plastic deformation of the fitting portion 23b.

This structure eliminates the necessity to control the amount of pre-load by fastening the outer joint member using a nut as in the prior art. Thus, it is possible to reduce weight and size of the bearing apparatus and increase the strength and durability of the wheel hub 12 and to keep the amount of pre-load for a long time. End caps 27, 28 are mounted respectively on openings of the wheel hub 12 and the hollow shaft portion 23 of the outer joint member 16. They prevent entry of rain water and dusts into the bearing from the outside and leakage of grease contained in the bearing.

In double row rolling bearings with double row tapered roller bearing 13, since the tapered rollers 3, 3 tend to rub the raceway surfaces along their generating lines during assembly of the bearing, it is difficult to keep a stable inside gap of the bearing during the radial enlarging and caulking step. Thus, grease is expelled from the line contacting region and causes metal-to-metal contact and increases the frictional coefficient in the contacting portions. Accordingly, a problem exists in that the tapered rollers 3, 3 may not smoothly move toward the large flanges 2b, 2b and thus would be assembled in a misaligned condition. For example, the inside gap would be a positive gap when a negative gap needs to be obtained. Thus, a case is created where a desirable pre-load cannot be applied. This would be further accentuated when the center line of each tapered roller 3 is inclined relative to its ordinal rotation axis, when a so-called skew is generated.

In order to avoid such a problem, the plastic deformation connection in the radially enlarged and caulking step is carried out with a relative swing motion (reciprocal motion) or a rotation (one way rotation) between the wheel hub 12 and outer joint member 16 and the outer member 2 in the present embodiment. In practice the wheel hub 12 and the shaft portion 23 of the outer joint member 16 are united via plastic deformation by inserting the enlarging tool into the shaft portion 23. The outer member 2 is reciprocated relative to the wheel hub 12 while supporting the wheel hub 12 on a top surface of a working bench. This enables the double row tapered rollers 3, 3 to smoothly slide on the raceway surfaces and to be stably aligned to the large flanges 2b, 2b. Accordingly a predetermined pre-load can be accurately applied.

Although it is shown that the wheel hub 12 and the outer joint member 16 are united via plastic deformation by deforming the shaft portion of the outer joint member radially outward, it is also possible to unite the wheel hub 12 and the outer joint member 16 by inserting the shaft portion of the outer joint member into the wheel hub and plastically deforming the end of the shaft portion in a direction other than radially outward to form a caulking portion in order to axially secure the wheel hub and the outer joint member, a so-called swing caulking method.

FIG. 7 is a longitudinal section view of a third embodiment of the vehicle wheel bearing apparatus. The same reference numerals are used to designate the same parts as those having the same functions used in the previous embodiments.

This wheel bearing apparatus is formed as a unit of a wheel hub 29, a double row rolling bearing 30 and a constant velocity universal joint 31. A double row rolling bearing 30 includes an outer member 32, an inner member 33, and double row tapered rollers 34, 35. The inner member 33 includes the wheel hub 29 and an outer joint member 37 fit into the wheel hub 29.

The outer member 32 is made of medium/high carbon steel including carbon of 0.40~0.80% by weight, such as S53C. The outer member is integrally formed with a body mounting flange 32c on its outer circumferential surface. Its inner circumferential surface includes tapered outer raceway surfaces 32a, 32b. The double row outer raceway surfaces 32a, 32b are hardened by high frequency induction quenching to have a surface hardness of 58~64 HRC.

The wheel hub 29 is made of medium/high carbon steel including carbon of 0.40~0.80% by weight, such as S53C. The wheel hub is integrally formed with a wheel mounting flange 6 at its outer side end. A plurality of hub bolts 6a are mounted on the wheel mounting flange 6 equidistantly along its periphery. The wheel hub 29 is formed with one (i.e., outer side) tapered inner raceway surface 29a on its outer circumferential surface arranged opposite to one of the double row outer raceway surfaces 32a, 32b. A cone back face rib 29c is adjacent the large diameter side of the inner raceway surface 29a. A cylindrical portion 29b axially extends from the inner raceway surface 29a. The wheel hub 29 is hardened by high frequency induction quenching. It has a region that includes a seal land portion 6b, to which the outer side seal 36 sliding contacts, the inner raceway surface 29a and the cylindrical portion 29b and has a surface hardness of 58~64 HRC. Accordingly, not only is the wear resistance of the base 6b forming the seal land portion of the outer side seal 36 improved but the wheel hub 29 has sufficient mechanical strength against rotary bending loads applied to the wheel mounting flange 6.

The constant velocity universal joint 31 includes the outer joint member 37, the joint inner ring 18, the cage 19 and torque transmitting balls 20. The outer joint member 37 is made of medium/high carbon steel including carbon of 0.40~0.80% by weight, such as S53C, and is integrally formed with a cup shaped mouth portion 21, shoulder 38, forming a bottom of the mouth portion 21, and a cylindrical shaft portion 23, axially extending from the shoulder 38. The shaft portion 23 is formed by a spigot portion 23a fit into the cylindrical portion 29b of the wheel hub 29 via a predetermined radial gap. A fitting portion 23b is at the end of the spigot portion 23a.

An outer circumferential surface of the shoulder 38 is formed with the other (inner side) tapered inner raceway surface 37a opposite to the other of the double row outer raceway surface 32a, 32a. The track grooves 21a and a region including a seal fit portion, to which an inner side seal 24 sliding contacts, the inner raceway surface 37a and the shaft portion 23 are hardened by high frequency induction heating to have a surface hardness of 58~64 HRC.

A plurality of the double row tapered rollers 34, 35 are contained between the outer member double row outer raceway surfaces 32a, 32b and the double row inner raceway surfaces 29a, 37a opposite to the double row outer raceway surfaces 32a, 32b. The rollers 34, 35 are freely rollably held by the cages 39, 40. The seals 36, 24 are mounted on both ends of the outer member 32. The seals prevent leakage of grease contained in the bearing and entry of rain water and dusts into the bearing from the outside. The double row rolling bearing 30 forms a so-called back-to-back double row tapered roller bearing where the smaller the distance of the line of action of force applied to both raceway surfaces 32a, 29a and 32b, 37a from the axial center, the larger the distance between the rollers in their axial direction.

In the present embodiment a pitch circle diameter PCDi of the inner side rolling elements 35 is larger than a pitch circle diameter PCDo of the outer side rolling elements 34. Since the specifications of the rolling elements 34, 35 are the same, the number of the inner side rolling elements 35 is larger than the number of the outer side rolling elements 34. In this case, the specifications of the rolling elements 34, 35 denote the length of roller, the outer diameter of roller, the inclination angle of roller, and the radius of curvature of the larger end of the roller. In a case of such double row tapered roller bearing, if desiring to differentiate the pitch circle diameters PCDo and PCDi without changing the specifications, such as the inclination angle of roller or the radius of curvature, the inclination angles of the inner side and outer side raceway surfaces have to be differentiated. In the present embodiment it is possible to avoid erroneous assembly, to reduce manufacturing cost and to increase reliability of the bearing by setting the specifications of the double row rollers 34, 35.

Due to the difference of the pitch circle diameters PCDo, PCDi, the diameter of the inner raceway surface 37a of the outer joint member 37 is larger than that of the inner raceway surface 29a of the wheel hub 29 in the inner member 33. On the other hand, due to the difference of the pitch circle diameters PCDo, PCDi, the diameter of the inner side outer raceway surface 32b is larger than that of the outer side outer raceway surface 32a in the outer member 32.

In the wheel bearing apparatus of such a structure, since the inner side inner raceway surface 37a is directly formed on the outer circumferential surface of the shoulder 38 of the outer joint member 37, it is possible to set the pitch circle diameter PCDi of the inner side rollers 35 larger than the pitch circle diameter PCDo of the outer side rollers 34 and to set the number of the inner side rollers 35 larger than the number of the outer side rollers 34. Accordingly it is possible to reduce weight and size of the bearing apparatus and to extend the life of the bearing apparatus due to the increase of the bearing rigidity of the inner side as compared with the outer side.

Although the structure is shown with the large flange for guiding the rolling elements (tapered rollers) 34, 35 formed on the inner member 33 (i.e. the wheel hub 29 and the outer joint member 37), it may be possible to form the large flange on the outer member 32 similarly to the previous embodiments since falling out of the rolling elements 34, 35 radially inward can be prevented by the cages 39, 40.

A method for uniting the wheel hub 29, the double row rolling bearing 30 and the constant velocity universal joint 31 will be described. The double row rolling elements, tapered rollers, are temporarily assembled on the double row outer raceway surfaces 32a, 32b of the outer member 32 via the cages 39, 40. The seals 36, 24 are mounted on both ends of the outer member 32. The shaft portion 23 of the outer joint member 37 is inserted into the wheel hub 29 from the inner side until the shoulder 38 of the outer joint member 37 abuts the end face of the cylindrical portion 29b of the wheel hub 29. An expanding tool, such as a mandrel, is pushed into a bore of the fitting portion 23b of the shaft portion 23 to radially expand the fitting portion 23b in order to bite the outer circumferential surface of the fitting portion 23b into the irregular portions 17 of the wheel hub 29. Thus, the wheel hub 29 and the outer joint member 37 are integrally united, via plastic deformation of the fitting portion 23b. This structure eliminates the necessity to control the amount of pre-load by fastening the outer joint member using a nut as in the prior art. Thus, it is possible to reduce weight and size of the bearing apparatus and increase the strength and durability of the wheel hub 29 and keep the amount of pre-load for a long term.

In the double row rolling bearing 30 including double row tapered rollers, it is difficult to keep a stable inside gap of the bearing during the radially enlarging and caulking step. Thus, the tapered rollers 34, 35 tend to rub the raceway surfaces along their generating lines during assembly of the bearing. Accordingly, lubricant such as grease is expelled from the line contacting region and causes metal-to-metal contact. This increases the frictional coefficient in the contacting portions. Thus, a problem exists that the tapered rollers 34, 35 may not smoothly move toward the large flanges and therefore would be assembled in a misaligned condition. For example the inside gap would be a positive gap when a negative gap needs to be obtained. Thus, a case is created where a desirable pre-load cannot be applied. This would be further accentuated when the center line of tapered rollers 34, 35 is inclined relative to its ordinal rotation axis, when a so-called skew is generated.

In order to avoid such a problem, the plastic deformation connection in the radially enlarging and caulking step is carried out with a relative swing motion (reciprocal motion) or a rotation (one way rotation) between the wheel hub 29 and outer joint member 37 and the outer member 32 in the present embodiment. In practice, the wheel hub 29 and the shaft portion 23 of the outer joint member 37 are united via plastic deformation by inserting the enlarging tool into the shaft portion 23 with the outer member 32 being reciprocated relative to the wheel hub 29 under a supporting condition of the wheel hub 29 on a top surface of a working bench. This enables the double row tapered rollers 34, 35 to smoothly slide on the raceway surfaces and to be stably aligned to the large flanges. Accordingly, a predetermined pre-load can be applied accurately.

Although it is shown that the wheel hub 29 and the outer joint member 37 are united via plastic deformation by deforming the shaft portion of the outer joint member radially outward, it is also possible to unite the wheel hub 29 and the outer joint member 37 by inserting the shaft portion of the outer joint member into the wheel hub and by plastically deforming the end of the shaft portion in a direction other than radially outward to form a caulking portion in order to axially secure the wheel hub and the outer joint member (i.e. a so-called swing caulking method).

FIG. 8 is a longitudinal section view of a fourth embodiment of the vehicle wheel bearing apparatus. Since the present embodiment is different from the third embodiment (FIG. 7) only in the structure of the inner side bearing array, the same reference numerals are used to designate the same parts as those having the same functions used in the previous embodiments. A detailed explanation will be omitted.

This wheel bearing apparatus is formed as a unit of a wheel hub 29, a double row rolling bearing 40 and a constant velocity universal joint 41. A double row rolling bearing 40 includes an outer member 42, an inner member 43, and double row rolling elements 34, 44. The inner member 43 includes the wheel hub 29 and an outer joint member 45 fit into the wheel hub 29.

The outer member 42 is made of medium/high carbon steel including carbon of 0.40~0.80% by weight, such as S53C. The outer member is integrally formed with a body mounting flange 32c on its outer circumferential surface. It includes an inner circumferential surface with an outer side tapered outer raceway surface 32a and an inner side circular arc outer raceway surface 42a. These double row outer raceway surfaces 32a, 42a are hardened by high frequency induction quenching to have a surface hardness of 58~64 HRC.

The outer joint member 45 of the constant velocity universal joint 41 is made of medium/high carbon steel including carbon of 0.40~0.80% by weight, such as S53C. The joint is integrally formed with a cup shaped mouth portion 21, a shoulder 46, forming a bottom of the mouth portion 21, and a cylindrical shaft portion 23 axially extending from the shoulder 46. An inner side inner raceway surface 45a is formed directly on the outer circumferential surface of the shoulder 46 opposite to the outer raceway surface 42a of the outer member 42. A plurality of rolling elements 34, 44 are contained between the double row outer raceway surfaces 32a, 42a of the outer member 42 and the double row inner raceway surfaces 29a, 45a of the inner member 43. The rollers are freely rollably held by cages 39, 47.

In the present embodiment the pitch circle diameter PCDi of the inner side rolling elements (balls) 44 is set larger than the pitch circle diameter PCDo of the outer side rolling elements (tapered rollers) 34. Due to the difference of the pitch circle diameters PCDo, PCDi, the number of inner side rolling elements 44 may be set larger than the number of outer side rolling elements 34.

In the wheel bearing apparatus having such a structure, since the inner side bearing array is formed by the rolling elements, as balls, and the inner side inner raceway surfaces 45a is directly formed on the outer circumferential surface of the shoulder 46 of the outer joint member 45, it is possible to set the pitch circle diameter PCDi of the inner side rolling elements 44 larger than the pitch circle diameter PCDo of the outer side rolling elements 34. Also, the number of inner side rolling elements 44 is set larger than the number of the outer side rolling elements 34. Accordingly it is possible to further reduce the axial size of the bearing apparatus while keeping the loading capacity of the double row bearing arrays or balance of the rigidity of the bearing apparatus.

FIG. 9 is a longitudinal section view of a fifth embodiment of the vehicle wheel bearing apparatus. Since the present embodiment is different from the fourth embodiment (FIG. 8) only in the structure of the left and right bearing arrays, the same reference numerals are used to designate the same parts as those having the same functions used in the previous embodiments. Detailed explanation will be omitted.

This wheel bearing apparatus is formed as a unit of a wheel hub 48, a double row rolling bearing 49 and a constant velocity universal joint 31. A double row rolling bearing 49 includes an outer member 50, an inner member 51, and double row rolling elements 52, 35. The inner member 51 includes the wheel hub 48 and an outer joint member 37 fit into the wheel hub 48.

The outer member 50 is made of medium/high carbon steel including carbon of 0.40~0.80% by weight, such as S53C. The outer member is integrally formed with a body mounting flange 32c on its outer circumferential surface. The outer member inner circumferential surface has an outer side circular arc outer raceway surface 50a and an inner side tapered outer raceway surface 32a. These double row outer raceway surfaces 50a, 32a are hardened by high frequency induction quenching so as to have a surface hardness of 58~64 HRC.

The wheel hub 48 is made of medium/high carbon steel including carbon of 0.40~0.80% by weight, such as S53C. The wheel hub is formed with one (outer side) circular arc inner raceway surface 48a and a cylindrical portion 48b axially extending from the inner raceway surface 48a. The wheel hub 48 is hardened by high frequency induction quenching. A region including the base 6b, to which the outer side seal 36 sliding contacts, inner raceway surface 48a and the cylindrical portion has a surface hardness of 58~64 HRC.

Double row rolling elements 52, 35 are contained between the outer member double row outer raceway surfaces 50a, 32b and the double row inner raceway surfaces 48a, 37a opposite to the double row outer raceway surfaces 50a, 32b. The rollers are freely rollably held by the cages 53, 40.

In the present embodiment the pitch circle diameter PCDo of the outer side rolling elements (balls) 52 is set larger than the pitch circle diameter PCDi of the inner side rolling elements (tapered rollers) 35. Due to the difference of the pitch circle diameters PCDo, PCDi, the number of outer side rolling elements 52 may be set larger than the number of inner side rolling elements 35.

In the wheel bearing apparatus having such a structure, since the outer side bearing array is formed by rolling elements including balls 52 and the pitch circle diameter PCDo of the outer side rolling elements 52 is set larger than the pitch circle diameter PCDi of the inner side rolling elements 35 and the number of the outer side rolling elements 52 is set larger than the number of the inner side rolling elements 35, it is possible to reduce the axial size of the bearing apparatus while keeping the loading capacity of the double row bearing arrays or balance of the rigidity of the bearing apparatus.

The vehicle wheel bearing apparatus can be applied to wheel bearing apparatus of the third or fourth generation where the inner raceway surface is directly formed on the outer circumferential surface of the wheel hub.

The present disclosure has been described with reference to the preferred embodiments. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A back-to-back double row tapered roller bearing comprising:
    an outer member integrally formed with a body mounting flange on an outer surface, the body mounting flange is to be mounted on a suspension apparatus of a vehicle, and said outer member formed, on an inner surface, with double row outer raceway surfaces tapered open respectively axially inward and outward and a cone back face rib at each outer raceway surface for guiding tapered roller elements on both said double row outer raceway surface;
    an inner member including a wheel hub and an inner ring or an outer joint member of a constant velocity universal joint, the wheel hub having a wheel mounting flange integrally formed at one end and one inner raceway surface formed on an outer circumferential surface arranged opposite to one of the double row outer raceway surfaces, a cylindrical portion axially extending from said inner raceway surface, said inner ring or the outer joint member of a constant velocity universal joint being press fit onto the cylindrical portion and formed, on an outer circumferential surface, with another inner raceway surface arranged opposite to the other raceway surface of the double row outer raceway surfaces;
    double row tapered rollers freely rollably held between the outer and inner raceway surfaces by cages;
    seals arranged in annular openings formed by the outer and inner members at both ends, said cages are formed of synthetic resin by injection molding;
    posts between pockets of the cages are arranged to be positioned radially inward of the pitch circle diameter of the tapered rollers;
    a width of an opening radially inward of each pocket is set so that each tapered roller is held within the pocket, contacting tapered surfaces of the posts are opened radially outward so that rollers do not fall out radially inward and said tapered surfaces are entirely tapered along said posts so that said rollers extend through said cage providing a gap between said cage and said inner member; and
    said cone back face ribs on said outer member prohibiting axial movement of said tapered rollers on both said outer raceway surface which, in turn, prohibits axial movement of said cages on said outer member, wherein said cages are prevented from contacting said seals secured to said outer member.

2. The vehicle wheel bearing apparatus claim 1 wherein the inner member comprises the wheel hub and the outer joint member fit into the wheel hub, the outer joint member is integrally formed with a cup-shaped mouth portion, a shoulder portion, on which outer circumferential surface said other inner raceway surface is directly formed, and a shaft portion axially extending from the shoulder portion, and the wheel hub and the outer joint member are united by plastically deforming a hollow end of the shaft portion and caulking it on the wheel hub.

3. The vehicle wheel bearing apparatus of claim 2 wherein the wheel hub and the outer joint member are united by radially outwardly expanding the hollow end of the shaft portion of the outer joint member and biting it into a hardened irregular portion formed on an inner circumferential surface of the wheel hub.

4. The vehicle wheel bearing apparatus of claim 1 wherein the inner member comprises the wheel hub and the inner ring press fit onto the cylindrical portion of the wheel hub via a predetermined interference, and wherein an inner side base portion of the wheel mounting flange is rounded and its surface which directly contacts the seal is hardened.

5. The vehicle wheel bearing apparatus claim 1 wherein at least an inner side seal comprises a slinger press fit onto the inner member, and an annular sealing plate, including a metal core, press fit into the outer member and a sealing member integrally adhered to the metal core via vulcanized adhesion, and wherein each of the slinger and the metal core has a substantially "L" shaped cross section and are arranged opposite toward each other so that the sealing member slidingly contacts the slinger.

6. A method of assembling the tapered rollers in the outer member, fitting the cages in the outer member radially inward, and assembling a wheel hub and an inner ring in a wheel bearing apparatus for a driving wheel according to claim 1.

* * * * *

UNITED STATES PATENT AND TRADEMARK OFFICE
CERTIFICATE OF CORRECTION

PATENT NO.       : 7,857,521 B2
APPLICATION NO.  : 12/115730
DATED            : December 28, 2010
INVENTOR(S)      : Mitsuru Umekida et al.

It is certified that error appears in the above-identified patent and that said Letters Patent is hereby corrected as shown below:

Column 7
Line 51 "base 13b" should be --base 6b--

Signed and Sealed this
Fifth Day of April, 2011

David J. Kappos
*Director of the United States Patent and Trademark Office*